Patented Dec. 18, 1928.

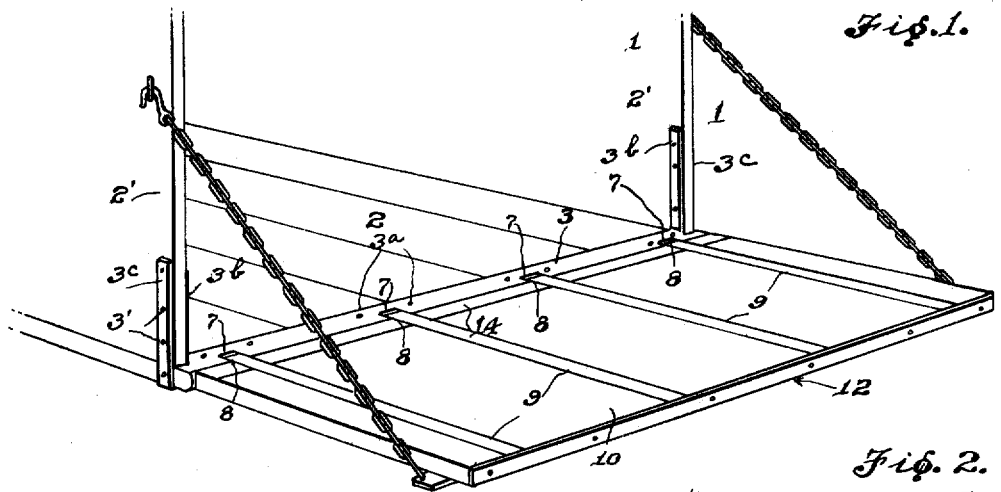
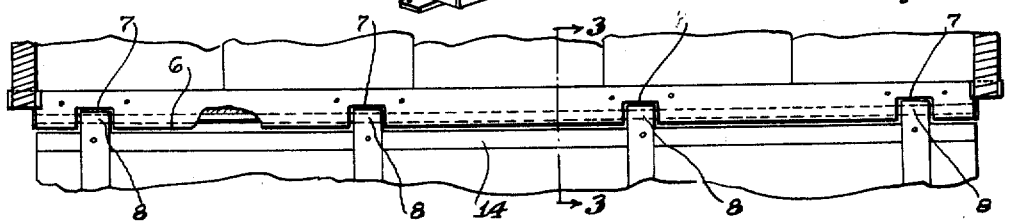
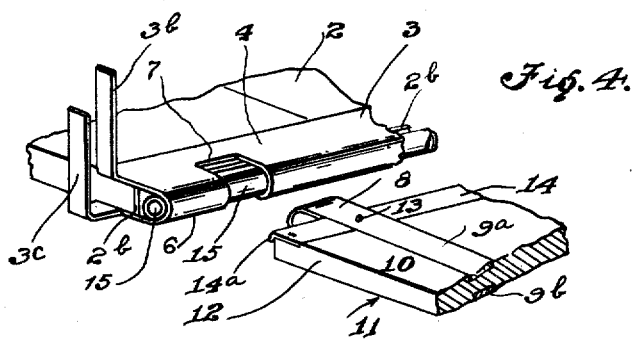
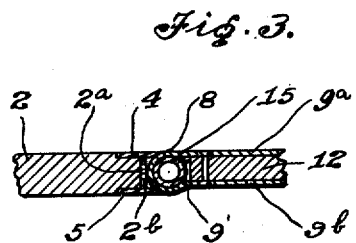
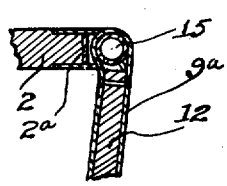
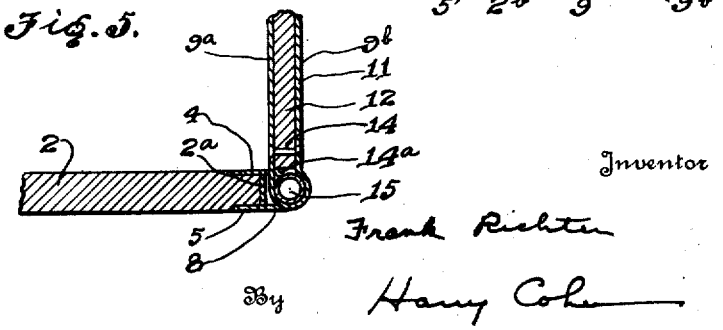

1,695,609

UNITED STATES PATENT OFFICE.

FRANK RICHTER, OF UNION, NEW JERSEY.

TAILBOARD AND TAILBOARD MOUNTING FOR TRUCKS AND THE LIKE.

Application filed June 27, 1927. Serial No. 201,880.

This invention relates to improvements in tail-boards and tail-board mounting for trucks and the like.

A prime object of this invention is to produce a tail-board and tail-board mounting for trucks wherein said mounting constitutes a hinge for the tail-board and a bumper or protective device therefor and for the truck.

Another object of the invention is to produce a tail-board and tail-board mounting for trucks which will enable a substantially flush surface and close joint to be provided at the connection between the tail-board and end of the truck when the said tail-board is lowered to permit loading of the truck.

Another object of the invention is to provide such a close joint between the end or tail of the truck and the adjacent edge portion of the tail-board as will permit the facile rolling of furniture, pianos and the like having casters across the joint between the said tail-board and the end of the truck and will avoid the breakage of such casters during such movement of the furniture across said joint.

Another object of the invention is to produce a tail-board for trucks and the like forming a connection which will be strong and rigid as well as being close and which will withstand extremely rough usage and have great endurance qualities.

Another object of the invention is to produce an extremely simple, hinged connection preferably formed of all metal parts.

Another object of the invention is to produce a hinge connection between a tail-board and the end of a truck in which a round pipe or rod may be utilized as a pivot and in which part of the knuckles of the hinge will be formed by providing notches in a metallic edge piece, preferably of U-shaped configuration, extending to opposite surfaces of one of the parts to be connected thereby, such as the edge of the truck and cooperating hinge-knuckles will also consist of looped straps projecting from the edge of the other hinged part such as the edge of the tail-board and engaging opposite surfaces thereof.

Another object of this invention is to provide means for preventing rattling between the tail-board and the end of the truck and preferably to provide a metal edge strip having a spring bend which, when the tail-board is closed, will be compressed against the upper surface of the rear end and will thus prevent rattling between said parts and when the tail-board is in open horizontal position, the said bent portion of said strip will partially close the joint between the two hinged parts and divide the normal space into two relatively small parts. Said metal strip will further protect the tail-board from splitting and from undue wear.

A further object is to provide, in combination with the hinge member positioned at the tail of the truck, body braces which engage the sides of the truck at the inner and outer surfaces thereof in lieu of or in addition to the usual body bracing irons.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a perspective view of the end portion of a truck having a tail-board and mounting embodying my invention;

Fig. 2 is an enlarged fragmentary plan view of the tail board and mounting;

Fig. 3 is a section on the line 3—3 of Fig. 2.

Fig. 4 is a view, in perspective, of fragments of the end of a truck and tail-board showing the parts in separated position;

Fig. 5 is a fragmentary sectional view of the end of a truck and tail-board with the latter in its raised position; and Fig. 6 is a view similar to Fig. 5 with the tail-board in its lowered position.

Referring now to these drawings, which illustrate a preferred embodiment of my invention, 1 indicates a truck and 2 the floor thereof which, in the embodiment shown, has the edge of its rear end provided with a metallic U-shaped bar 3 fastened thereto by screws $3^a$, comprising a looped knuckle portion extending outwardly beyond the edge $2^a$ of the end of the truck and being of a thickness substantially equal to the thickness of the floor 2, and having an upper flange 4 preferably embedded into the upper surface of the floor 2 and a lower flange 5 engaging and embedded in the bottom surface of the floor 2. The said bar 3 extends a sufficient distance beyond the edge $2^a$ of the floor 2 to provide space for a pivot, preferably of cylindrical configuration, and is provided at suitable places with a series of notches 7 so as to cause the looped portion of said bar to form a series of projecting hinged knuckles, into the said notches between which knuckles a series of cooperating looped knuckles 8 extend. These cooperating knuckles 8 are, as illustrated, formed at the end of U-shaped straps 9 having portions $9^a$, $9^b$ engaging the upper and lower surfaces 10 and 11 respectively of a tail-board 12, the said portions $9^a$, $9^b$ of said straps 9 preferably being embedded in the upper and lower surfaces 10 and 11 respectively and suitably fastened thereto, as by screws 13. The upper surface 10 of the tail-board adjacent to the edge of the truck is preferably provided with an edging strip 14 and the edge of the truck $2^a$ may have an edging strip $2^b$.

The strip 14 is preferably provided with a spring-bend $14^a$ and is preferably made of spring steel or the like so that when the tail-board is swung upwardly to its vertical position on its seat on the surface of the bar 3, the bent edge of the spring strip $14^a$ will be engaged and the spring will be stressed, and thus prevent rattling of the tail-board on its seat during movement of the vehicle. The strip 14 further protects the edge of the tail-board from splitting.

The U-shaped hinge-member 3 is provided with lateral extensions $3^b$ and $3^c$ at each end thereof, inner extensions $3^b$ engaging the inner surface of the sides of the truck and the outer extensions $3^c$ engaging the outer surface of the side 2' of the truck and are secured to the truck sides as by screws or bolts 3'. These side extensions serve to brace the body of the truck and may be used instead of or in addition to the usual body bracing irons.

The knuckle joints 8 are inserted within the notches 7 in the bar 3, and then a pipe or rod 15 is passed through the knuckles 6 and 8 respectively so that the said pipe 15 becomes a pivot about which the knuckles 8 swing in their swinging or pivotal movement about the end of the truck.

A feature of the present invention is the construction provided whereby the hinge-bar 3 constitutes a bumper or protective means for the truck and tail-board when the latter is in its raised or lowered position. For this purpose, the tail-board is of thinner stock than the floor of the truck, the lower strap portions being inwardly bent, as at 9' near the knuckles 8. As shown by Fig. 5, when the tail-board is in its raised position, the floor 12, or the bar 3 secured thereto, extends beyond the lower surface 11 of the tail-board. Likewise, as shown by Fig. 6, when the tail-board is in its lowered position, the bar 3 extends beyond the upper surface 10 of the tail-board. Thus, in either position of the tail-board, the hinge-member or bar 3 acts as a bumper or protective device for the truck and tail-board.

It will be seen that this construction produces an extremely rigid connection between the tail-board and the tail end of the truck and also that a connection is formed in which the adjacent edges of the end of the truck and the tail-board will be located in extremely close flush relationship so that a piece of furniture having a caster, particularly heavy articles such as pianos, may be rolled across the tail-board and over this close joint and without dropping into the usual wide groove between the rear edge of the truck and the adjacent edge of the tail-board. Furthermore, an extremely rigid connection is provided which will not only have great strength and rigidity but will be extremely rugged and will possess great endurance qualities. Also, I have produced a spring connection between the tail-board and its seat at the end of the vehicle which will avoid rattling between said parts and will also compensate for wear between the parts of the hinged connection.

The metal strip provided at the edge of the tail-board on the upper surface thereof assists in providing for the flush relationship of the tail-board with the tail of the truck and prevents slipping or undue wear of the tail-board. The extension of the tail of the truck beyond the tail-board when the latter is either raised or lowered acts as a bumper as previously described.

This application relates to subject matter somewhat similar to that in my application, Serial Number 138,828, filed October 1, 1926.

Having described my invention, I claim:

1. A tail-board and tail-board mounting embodying, in combination, a hinge member fastened at the edge of the tail of a truck and engaging upper and lower surfaces thereof, and another hinge member mounted at the edge of the tail-board and likewise engaging opposite surfaces thereof, one of such hinge members being provided with knuckles and a notch between such knuckles and the other member having a projecting knuckle fitting within said notch, and a pivot member extending across said notch and within the knuckles to connect the two members together and to provide a close and strong connection between the edge of the truck and the adjacent edge of the tail-board, the hinge member secured to the edge of the tail of the truck extending beyond the face of the tail-board when in vertical position to thereby constitute a bumper or protective means for the truck and tail-board.

2. A tail-board and tail-board mounting embodying, in combination, a hinge member fastened to the edge of a truck, comprising a U-shaped bar cut at its U-shaped edge portion to provide a plurality of knuckles and knuckle notches, and other hinge members mounted on the tail-board and comprising straps having U-shaped knuckle portions extending beyond the edge of said tail-board and fitting within the notches in said U-shaped bar, and a pivot member extending within said knuckles of the bar and straps respectively to connect the members together and to provide a close and strong connection between the edge of the truck and the adjacent edge of the tail-board, said U-shaped bar extending beyond the face of the tailboard when in vertical position to thereby constitute a bumper or protective means for the truck and tail-board.

3. A tail-board and tail-board mounting embodying, in combination, a hinge member fastened at the edge of the tail of a truck and engaging opposite surfaces thereof and another hinge member mounted at the edge of the tail-board and likewise engaging opposite surfaces thereof, one of such hinge members being provided with a plurality of knuckles and notches between such knuckles and the other member having a plurality of projecting knuckles fitting within said notches, a pivot member extending across said notches and within the knuckles to connect the two members together and to provide a close and strong connection between the edge of the truck and the adjacent edge of the tail-board, and a spring edging strip on the inner face of the tail-board adapted to be placed under tension by the closing of the tail-board.

4. A tail-board and tail-board mounting embodying, in combination, a hinge member fastened at the edge of the tail of a truck and engaging upper and lower surfaces thereof, and another hinge member mounted at the edge of the tail-board and likewise engaging opposite surfaces thereof, one of such hinge members being provided with knuckles and a notch between such knuckles and the other member having a projecting knuckle fitting within said notch, and a pivot member extending across said notch and within the knuckles to connect the two members together and to provide a close and strong connection between the edge of the truck and the adjacent edge of the tail-board, the hinge member secured to the edge of the tail of the truck extending beyond the face of the tail-board when in vertical position to thereby constitute a bumper or protective means for the truck and tail-board, the tail-board being thinner than the edge of the tail of the truck.

In witness whereof, I have signed my name to the foregoing specification.

FRANK RICHTER.

CERTIFICATE OF CORRECTION.

Patent No. 1,695,609.  Granted December 18, 1928, to

FRANK RICHTER.

It is hereby certified that error appears in the printed specification of the above numbered patent requiring correction as follows: Page 2, line 100, beginning with the word "This" strike out all to and including the number "1926", line 102, and insert instead "The present application is a continuation in part of application, Serial No. 138,828, filed October 1, 1926";

and that the said Letters Patent should be read with this correction therein that the same may conform to the record of the case in the Patent Office.

Signed and sealed this 22nd day of January, A. D. 1929.

(Seal)

M. J. Moore,
Acting Commissioner of Patents.

mounted on the tail-board and comprising straps having U-shaped knuckle portions extending beyond the edge of said tail-board and fitting within the notches in said U-shaped bar, and a pivot member extending within said knuckles of the bar and straps respectively to connect the members together and to provide a close and strong connection between the edge of the truck and the adjacent edge of the tail-board, said U-shaped bar extending beyond the face of the tail-board when in vertical position to thereby constitute a bumper or protective means for the truck and tail-board.

3. A tail-board and tail-board mounting embodying, in combination, a hinge member fastened at the edge of the tail of a truck and engaging opposite surfaces thereof and another hinge member mounted at the edge of the tail-board and likewise engaging opposite surfaces thereof, one of such hinge members being provided with a plurality of knuckles and notches between such knuckles and the other member having a plurality of projecting knuckles fitting within said notches, a pivot member extending across said notches and within the knuckles to connect the two members together and to provide a close and strong connection between the edge of the truck and the adjacent edge of the tail-board, and a spring edging strip on the inner face of the tail-board adapted to be placed under tension by the closing of the tail-board.

4. A tail-board and tail-board mounting embodying, in combination, a hinge member fastened at the edge of the tail of a truck and engaging upper and lower surfaces thereof, and another hinge member mounted at the edge of the tail-board and likewise engaging opposite surfaces thereof, one of such hinge members being provided with knuckles and a notch between such knuckles and the other member having a projecting knuckle fitting within said notch, and a pivot member extending across said notch and within the knuckles to connect the two members together and to provide a close and strong connection between the edge of the truck and the adjacent edge of the tail-board, the hinge member secured to the edge of the tail of the truck extending beyond the face of the tail-board when in vertical position to thereby constitute a bumper or protective means for the truck and tail-board, the tail-board being thinner than the edge of the tail of the truck.

In witness whereof, I have signed my name to the foregoing specification.

FRANK RICHTER.

CERTIFICATE OF CORRECTION.

Patent No. 1,695,609. Granted December 18, 1928, to

FRANK RICHTER.

It is hereby certified that error appears in the printed specification of the above numbered patent requiring correction as follows: Page 2, line 100, beginning with the word "This" strike out all to and including the number "1926", line 102, and insert instead "The present application is a continuation in part of application, Serial No. 138,828, filed October 1, 1926";

and that the said Letters Patent should be read with this correction therein that the same may conform to the record of the case in the Patent Office.

Signed and sealed this 22nd day of January, A. D. 1929.

(Seal)

M. J. Moore,
Acting Commissioner of Patents.